Feb. 27, 1968

J. B. CATO 3,371,203

ROSETTE SPACER

Filed Nov. 29, 1965

INVENTOR.

John B. Cato

United States Patent Office 3,371,203
Patented Feb. 27, 1968

3,371,203
ROSETTE SPACER
John B. Cato, 206 Combs St., Milton, Fla. 32570
Filed Nov. 29, 1965, Ser. No. 510,262
4 Claims. (Cl. 240—78)

ABSTRACT OF THE DISCLOSURE

A ring-shaped device placeable against a ceiling for decoratively enclosing the sides of a junction box and a non-flammable filler around the junction box, the device supporting a depending lamp holder having a lamp, and having radial openings to receive conduit wires to the box and lamp.

This invention relates to spacing devices, and more particularly to a rosette spacer.

It is therefore the main purpose of this invention to provide a rosette spacer for supporting electric lamp fixtures and spacing conductor wires safely one from another.

Another object of this invention is to provide a rosette spacer which is fire-proof and provides cover for the junction box.

Another object of this invention is to provide a rosette spacer having an opening therein filled with non-flammable material which also can be used for spacing conductor wires in parallel relationship one from another thus assuring maximum safety.

A still further object of this invention is to provide a rosette spacer which is easy to manufacture and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
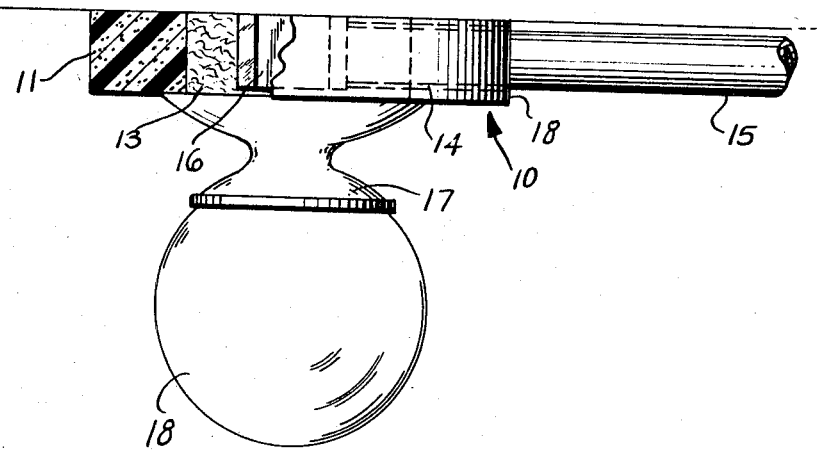
FIGURE 1 is a side view of the invention shown partly broken-away.

According to this invention, a rosette spacer 10 is provided with a substantially circular ring 11 having a circular opening 12 provided therein. A plurality of radially disposed holes 14 are positioned within ring 11. Junction box 16 is located within the opening 12 of ring 11 and is adapted to connect the ends of conductor wires 15 one to another and connect them with wires extending from lamp 18 (not shown). Lamp holder 17 is mounted to the bottom portion of ring 11 (see FIG. 1) thereby providing electric contacts between lamp 18 and conductor wires 15. Preferably circular ring 11 should be made from styrofoam or any other non-flammable plastic material.

Figure 2:
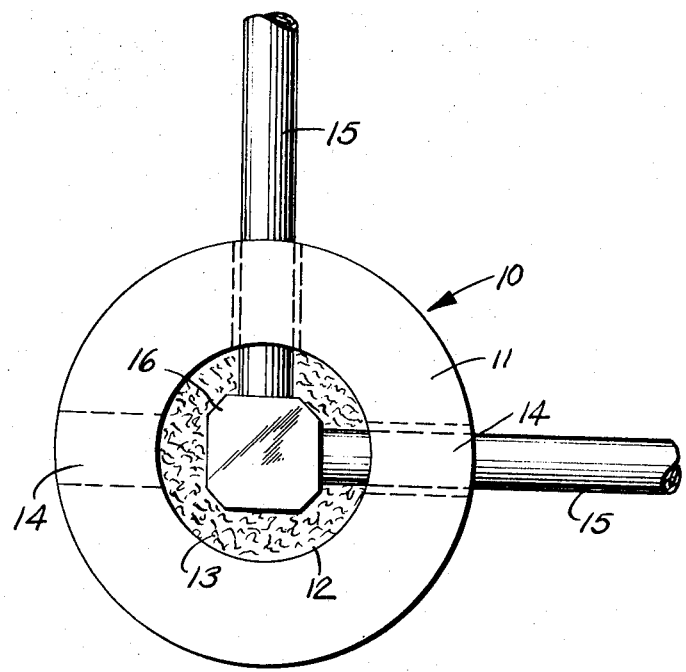
FIGURE 2 is a top plan view of the invention shown in FIGURE 1.

Looking now at FIGURE 2 of the drawing, one will see that circular ring 11 can be provided with any number of radially extending holes 14 for conductor wire or wires 15 and therefore being able to support and provide the electric power to a lamp arrangement which may be of a different configuration and size from that one shown in FIGURE 1.

It will also be noted that junction box 16 may be of a different size and shape from that one depicted in FIGURE 2 and in the previous description.

Furthermore, spacer 10 provides a cover for junction box 16 so that the junction box is not exposed for visual observation.

What I now claim is:

1. A rosette spacer comprising a circular spacer having an opening therein, a junction box positioned within said opening, a plurality of conductor wires having their ends positioned within said junction box, said spacer having a plurality of radially extending holes positioned in perpendicular relationship to said opening of said spacer, said conductor wires being partially enclosed and secured within said holes, filler means within said opening for maintaining spaced relationship between said conductor wires located between said junction box and the inner edges of said circular spacer and said spacer providing cover for said junction box.

2. A spacer according to claim 1, wherein said filler means include non-flammable filling material.

3. A spacer according to claim 1, wherein said spacer is non-flammable plastic material adapted to admit the top portion of a lamp holder.

4. A spacer according to claim 3, wherein said top portion of said lamp holder is adapted to be secured to the bottom portion of said spacer when said spacer is attached to the ceiling.

References Cited

UNITED STATES PATENTS

| | | | |
|---|---|---|---|
| 768,545 | 8/1904 | Shea | 174—63 |
| 1,873,384 | 8/1932 | Glowacki | 174—62 |
| 3,036,207 | 5/1962 | Endelson | 240—78 |

FOREIGN PATENTS

| | | |
|---|---|---|
| 971,153 | 12/1958 | Germany. |
| 200,373 | 7/1923 | Great Britain. |

NORTON ANSHER, Primary Examiner.

M. H. HAYES, Assistant Examiner.